(12) United States Patent
Morinaga

(10) Patent No.: US 8,285,116 B2
(45) Date of Patent: Oct. 9, 2012

(54) RECORDING APPARATUS, RECORDING METHOD, RECORDING MEDIUM, AND RECORDING SYSTEM

(75) Inventor: Takeo Morinaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 565 days.

(21) Appl. No.: 12/480,066

(22) Filed: Jun. 8, 2009

(65) Prior Publication Data

US 2009/0304360 A1 Dec. 10, 2009

(30) Foreign Application Priority Data

Jun. 9, 2008 (JP) ................. P2008-150909

(51) Int. Cl.
*H04N 9/80* (2006.01)
(52) U.S. Cl. ............... 386/248; 386/239; 386/200
(58) Field of Classification Search .............. None
See application file for complete search history.

(56) References Cited

U.S. PATENT DOCUMENTS

| | | | |
|---|---|---|---|
| 5,497,239 A | 3/1996 | Kwon | |
| 7,254,318 B2 * | 8/2007 | Imada et al. ............ | 386/329 |
| 2002/0061181 A1 | 5/2002 | Honjo | |
| 2003/0018983 A1 * | 1/2003 | Kawabata et al. ............ | 725/151 |
| 2003/0223140 A1 * | 12/2003 | Kobata et al. ................ | 360/15 |
| 2006/0098730 A1 * | 5/2006 | Tsuruta .............. | 375/240.01 |
| 2007/0286280 A1 | 12/2007 | Saigo et al. | |
| 2008/0069090 A1 * | 3/2008 | Rabipour et al. ........... | 370/356 |

FOREIGN PATENT DOCUMENTS

| | | |
|---|---|---|
| EP | 1 775 947 A1 | 4/2007 |
| EP | 2008-042660 | 2/2008 |
| JP | 2005-322004 | 11/2005 |

OTHER PUBLICATIONS

European Search Report mailed May 28, 2010, in EP 09 25 0954.

* cited by examiner

*Primary Examiner* — William C Vaughn, Jr.
*Assistant Examiner* — Eileen Adams
(74) *Attorney, Agent, or Firm* — Finnegan, Henderson, Farabow, Garrett & Dunner, L.L.P.

(57) ABSTRACT

A control unit of a recording apparatus determines a transfer mode of content data by an external device, re-encodes the content data by a re-encoding unit and records the re-encoded content data in a recording unit if the determined transfer mode is a first transfer mode with which the re-encoding unit is compatible, and records the content data in the recording unit, re-encodes the content data read out from the recording unit by the re-encoding unit, and re-records the re-encoded content data in the recording unit if the determined transfer mode is a second transfer mode with which the re-encoding unit is not compatible.

15 Claims, 11 Drawing Sheets

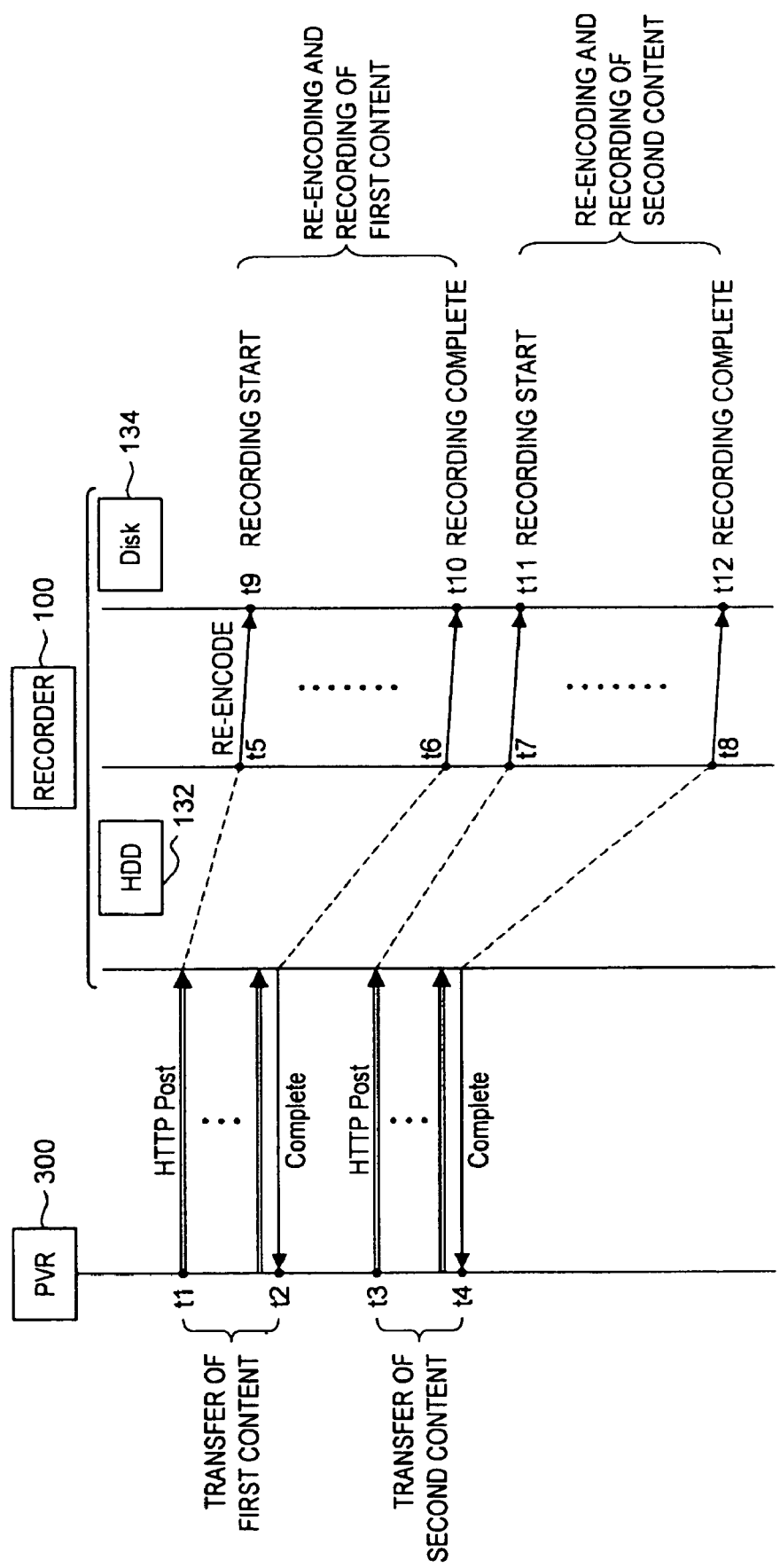

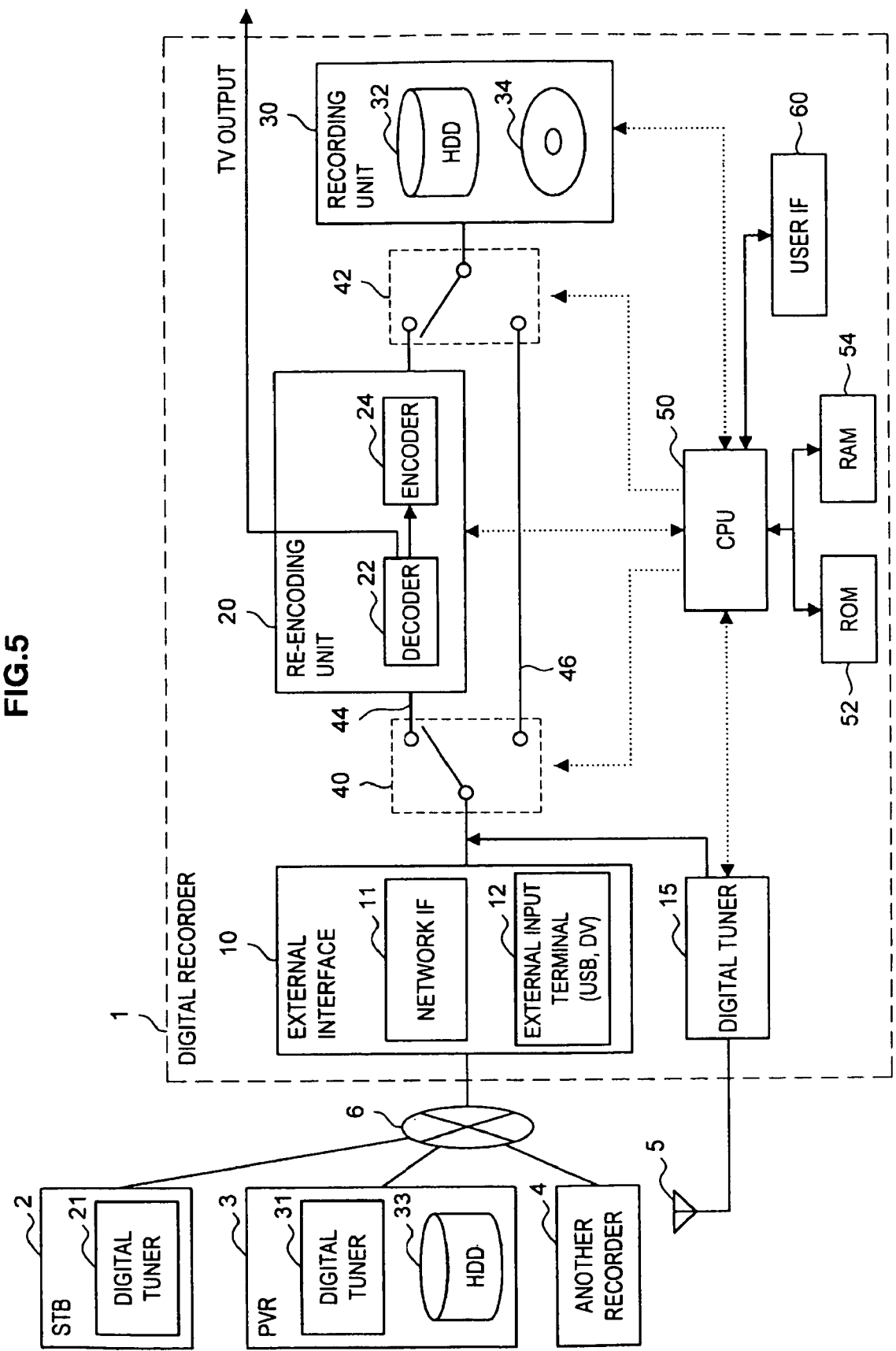

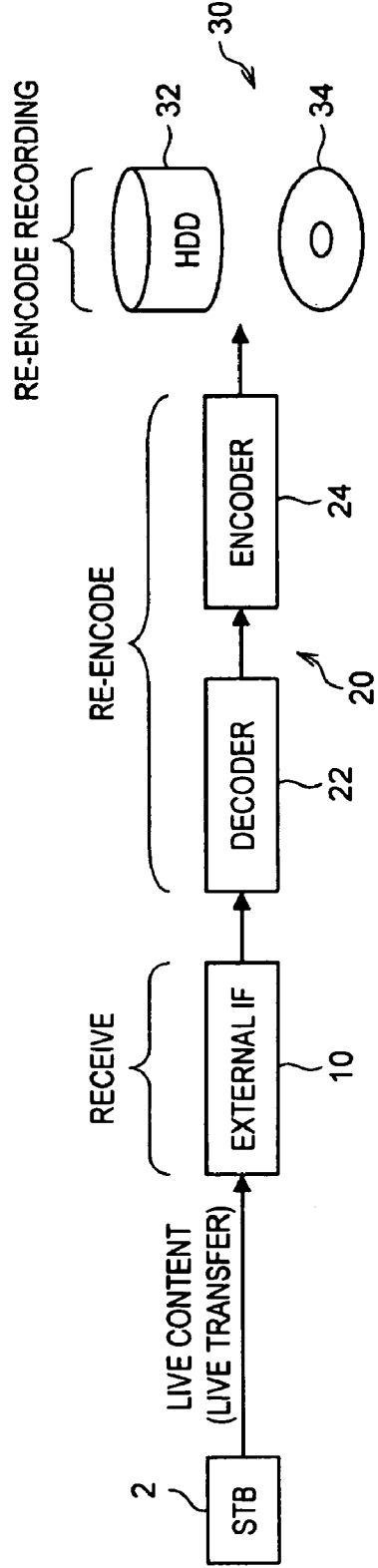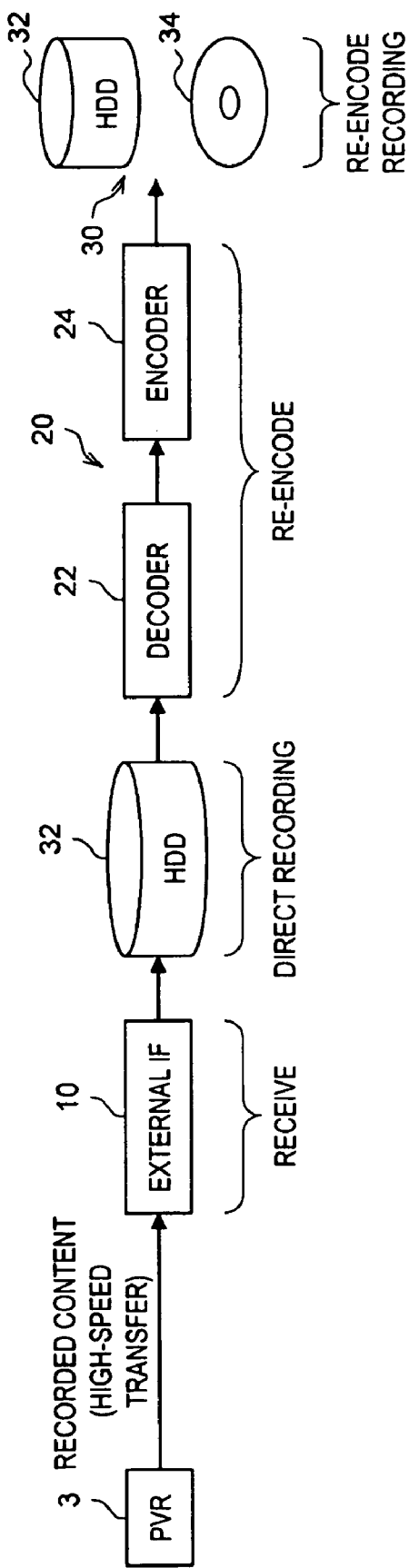

FIG.8

```
POST path of control URL HTTP/1.1
HOST: host of control URL:port of control URL
CONTENT-LENGTH: bytes in body
CONTENT-TYPE: text/xml; charset="utf-8"
SOAPACTION: "urn:schemas-upnp:org:
service:serviceTypeContentDirectory:1v#CDS:CreateObject"
<s:Envelope
xmlns:s="http://schemas.xmlsoap.org/soap/envelope/"
s:encodingStyle="http://schemas.xmlsoap.org/soap/encoding/">
<s:Body>
<u:CDS:CreateObject xmlns:u="urn:schemas-upnp:org:
service:ContentDirectoryserviceType:1v">
< containerID>DLNA.ORGorg_AnyContainer </containerID >
<Elements>
<DIDL-Lite xmlns="urn:schemas-upnp-org:metadata-1-0/DIDL-Lite/"
xmlns:dc="http://purl.org/dc/elements/1.1/" xmlns:upnp="urn:schemas-upnp-org:metadata-1-0/upnp/">
<item id="" parentID="DLNA.ORGorg_AnyContainer" restricted="0">
<dc:title>Title</dc:title>
<upnp:class>object.item.videoItem</upnp:class>
<TransferMode>Speed</TransferMode >      80
<res protocolInfo="*:*:application/x-dtcp1;DTCP1HOST=[host];DTCP1PORT=[port];CONTENTFORMAT=
video/vnd.dlna.mpeg-tts;DLNA.ORG_PN=DTCP_MPEG_TS_SD_EU_TMPEG_TS_SD_EU_T;*"></res>
</item>
</DIDL-Lite>
</Elements>
</u:CDS:CreateObject>
</s:Body>
</s:Envelope>
```

RECORDING APPARATUS, RECORDING METHOD, RECORDING MEDIUM, AND RECORDING SYSTEM

BACKGROUND OF THE INVENTION

1. Field of the Invention

The present invention relates to a recording apparatus, a recording method, a recording medium, and a recording system.

2. Description of the Related Art

In recent years, digital recording devices that can record image/audio digital data of a television broadcast program and the like are being widespread used. Such digital recording device includes a DVD (Digital Versatile Disk) recorder, HDD (Hard Disk Drive) recorder, BD (Blu-Ray Disk) recorder, and a complex device thereof.

Such digital recording devices record the externally input image/audio digital data on a recording medium after re-encoding the recording medium in accordance with the corresponding digital recording format. For instance, the DVD-Video format and the like are adopted in the DVD recorder and the HDD recorder, where the input DV (Digital Video) type data is once decoded and then re-encoded to the MPEG-2 (Moving Picture Experts Group phase 2) program stream (PS method), and then recorded. The BD-Video format and the like are adopted in the BD recorder, where the input data is re-encoded using a compression coding method such as "MPEG-2" or "H.264/MPEG-4 AVC (Advanced Video Coding)", and converted to the BD-Video format and then recorded.

In the digital recording device of the related art, the program content being broadcasted is received and recorded in real time from a tuner, or the externally input content is recorded in real time in most use cases. Thus, the digital recording device is designed in view of various considerations such as the function of reproducing while recording and the function of accepting the recording from the external tuner in order to respond to the real time recording.

Therefore, in the related art, the digital recording device for receiving and recording the content externally transferred at high speed is not common as a CE device (Consumer Electronics Device). This is because in the digital recording device, a codec for re-encoding the stream of content transferred from the outside is to be mounted, but the processing ability of the codec is limited due to restriction in cost and the like, and thus high speed transfer is not responded. It should be obvious that files can be transferred at high speed between the general-purpose device such as a personal computer (PC) and the peripheral device (e.g., Japanese Patent Application Laid-Open No. 2005-322004). However, since the transfer between the general-purpose devices such as the PC does not require re-encoding of the transfer data, the circumstances are different from the digital recording device.

SUMMARY OF THE INVENTION

The home network and the like have been enhanced in recent years, however, and cases where the user interconnect and use plural recording devices, or set top box (STB), personal video recorder (PVR) and the like are increasing. The content data thus can be transferred at high speed from an external device such as PVR to the recording device as in HDRL (High Definition Recording Link), and use cases where high speed transfer is more important than the function corresponding to the real time recording have come to exist.

On the contrary, in the use case of real time recording the broadcast program content being received by the external tuner of the STB and the like, the recording device is still demanded the function of reliably recording the content transferred from the STB and the like without recording leakage.

Therefore, it is desirable to provide a new and improved recording apparatus capable of selecting an optimum recording method according to the transfer mode of the content, a recording method, a recording medium, and a recording system.

According to an embodiment of the present invention, there is provided a recording apparatus including an interface for receiving content data transferred from at least one external device; a re-encoding unit for re-encoding the content data; a recording unit for recording the content data; and a control unit for controlling the re-encoding unit and the recording unit, wherein the control unit determines a transfer mode of the content data by the external device, re-encodes the content data by the re-encoding unit and records the re-encoded content data in the recording unit if the determined transfer mode is a first transfer mode with which the re-encoding unit is compatible, and records the content data in the recording unit, and thereafter, re-encodes the content data read out from the recording unit by the re-encoding unit, and re-records the re-encoded content data in the recording unit if the determined transfer mode is a second transfer mode with which the re-encoding unit is not compatible.

When accepting a transfer request of second content data transferred from the external device in the first transfer mode while re-encoding first content data transferred from the external device in the second transfer mode by the re-encoding unit and re-recording the re-encoded first content data in the recording unit, the control unit may stop or pause re-encoding and re-recording process of the first content data, and re-encode the second content data by the re-encoding unit and record the re-encoded second content data in the recording unit.

The first transfer mode may be a live transfer of transferring the content data currently being received by the external device at a transfer rate with which the re-encoding unit is compatible, and the second transfer mode may be a high-speed transfer of transferring the content data saved in the external device at a transfer rate with which the re-encoding unit is not compatible.

The control unit may determine the transfer mode of the content data by the external device by communicating with the external device before transfer of the content data.

The control unit may determine the transfer mode of the content data by the external device based on copy control information transferred with the content data.

The control unit may determine the transfer mode of the content data by the external device based on set information set in advance by a user.

The recording unit may include a first recording unit capable of recording the content data even if the content data transferred from the external device is not re-encoded, and a second recording unit capable of recording the content data if the content data transferred from the external device is re-encoded; and the control unit may record the content data in the first recording unit, and thereafter, re-encode the content data read out from the first recording unit by the re-encoding unit and record the re-encoded content data in the second recording unit when the determined transfer mode is the second transfer mode.

According to another embodiment of the present invention, there is provided a recording method including the steps of:

determining a transfer mode of content data by an external device; re-encoding the content data by a re-encoding unit and recording the re-encoded content data in the recording unit if the determined transfer mode is a first transfer mode with which the re-encoding unit is compatible; and recording the content data in the recording unit, and thereafter, re-encoding the content data read out from the recording unit by the re-encoding unit, and re-recording the re-encoded content data in the recording unit if the determined transfer mode is a second transfer mode with which the re-encoding unit is not compatible.

According to another embodiment of the present invention, there is provided a computer readable recording medium recorded with a program for causing a computer to execute the steps of: determining a transfer mode of content data by an external device; re-encoding the content data by a re-encoding unit and recording the re-encoded content data in the recording unit if the determined transfer mode is a first transfer mode with which the re-encoding unit is compatible; and recording the content data in the recording unit, and thereafter, re-encoding the content data read out from the recording unit by the re-encoding unit, and re-recording the re-encoded content data in the recording unit if the determined transfer mode is a second transfer mode with which the re-encoding unit is not compatible.

According to another embodiment of the present invention, there is provided a recording system including a recording apparatus; and at least one external device for transferring content data to the recording apparatus, wherein the recording apparatus includes an interface for receiving the content data transferred from the external device, a re-encoding unit for re-encoding the content data, a recording unit for recording the content data, and a control unit for controlling the re-encoding unit and the recording unit, the external device includes at least one of a first external device for transferring the content data to the recording apparatus in a first transfer mode with which the re-encoding unit is compatible, or a second external device for transferring the content data to the recording apparatus in a second transfer mode with which the re-encoding unit is not compatible, and the control unit determines a transfer mode of the content data by the external device, re-encodes the content data by the re-encoding unit and records the re-encoded content data in the recording unit if the determined transfer mode is the first transfer mode, and records the content data in the recording unit, and thereafter, re-encodes the content-data read out from the recording unit by the re-encoding unit, and re-records the re-encoded content data in the recording unit if the determined transfer mode is the second transfer mode.

According to the above configuration, the control unit of the recording apparatus determines a transfer mode of the content data by an external device, where the content data is re-encoded and recorded in the recording unit if the determined transfer mode is the first transfer mode, and the content data is recorded in the recording unit, and then the content data read out from the recording unit is re-encoded and re-recorded in the recording unit if the determined transfer mode is the second transfer mode.

According to the present invention described above, the optimum recording method can be selected according to the transfer mode of the content.

BRIEF DESCRIPTION OF THE DRAWINGS

FIG. 4 is a schematic view showing an ideal implementation timing of re-encoding of when transferring two content data;

FIG. 5 is a block diagram showing a configuration of a digital recorder according to a first embodiment of the present invention;

FIG. 6 is a block diagram showing a recording operation of the digital recorder according to the embodiment;

FIG. 8 is an explanatory view showing a specific example of a command used in the communication protocol;

DETAILED DESCRIPTION OF THE PREFERRED EMBODIMENTS

Figure 1:
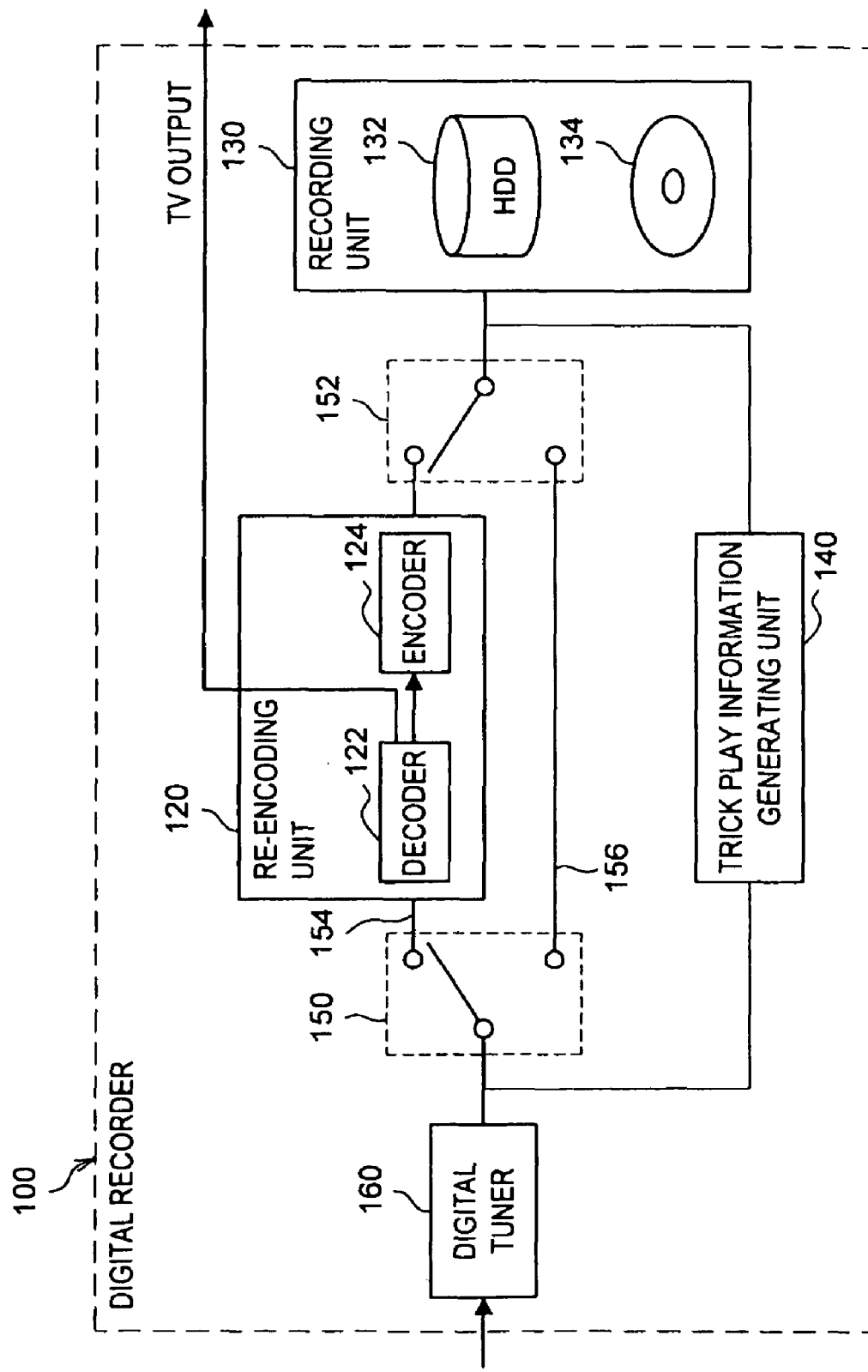
FIG. 1 is a block diagram showing a configuration of a digital recorder of the related art.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

A first embodiment of the present invention will be described below. The description is made in the following order.

Figure 7:
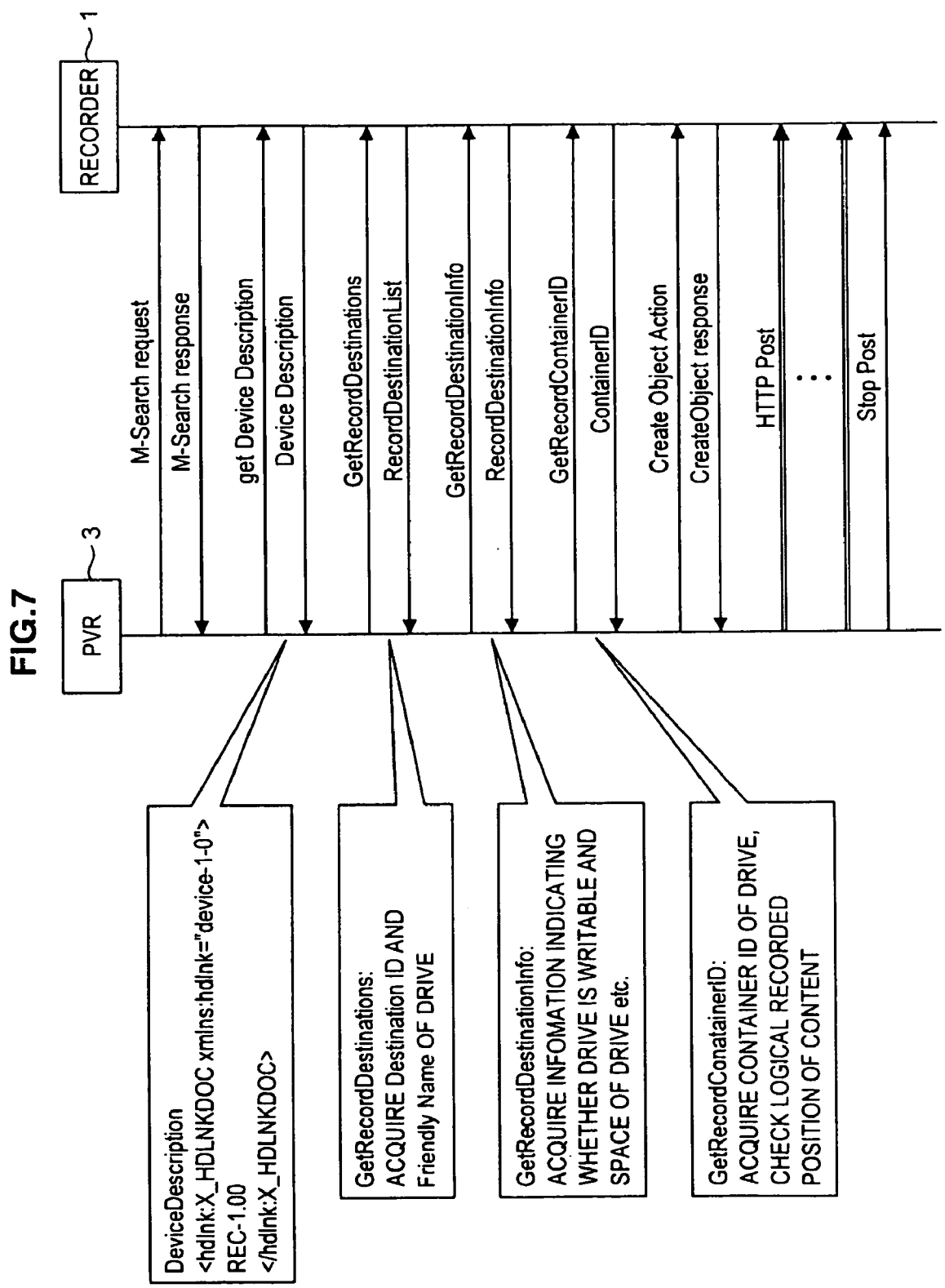
FIG. 7 is a sequence chart showing a communication in a transfer protocol defined in the HDRL.
Figure 9:
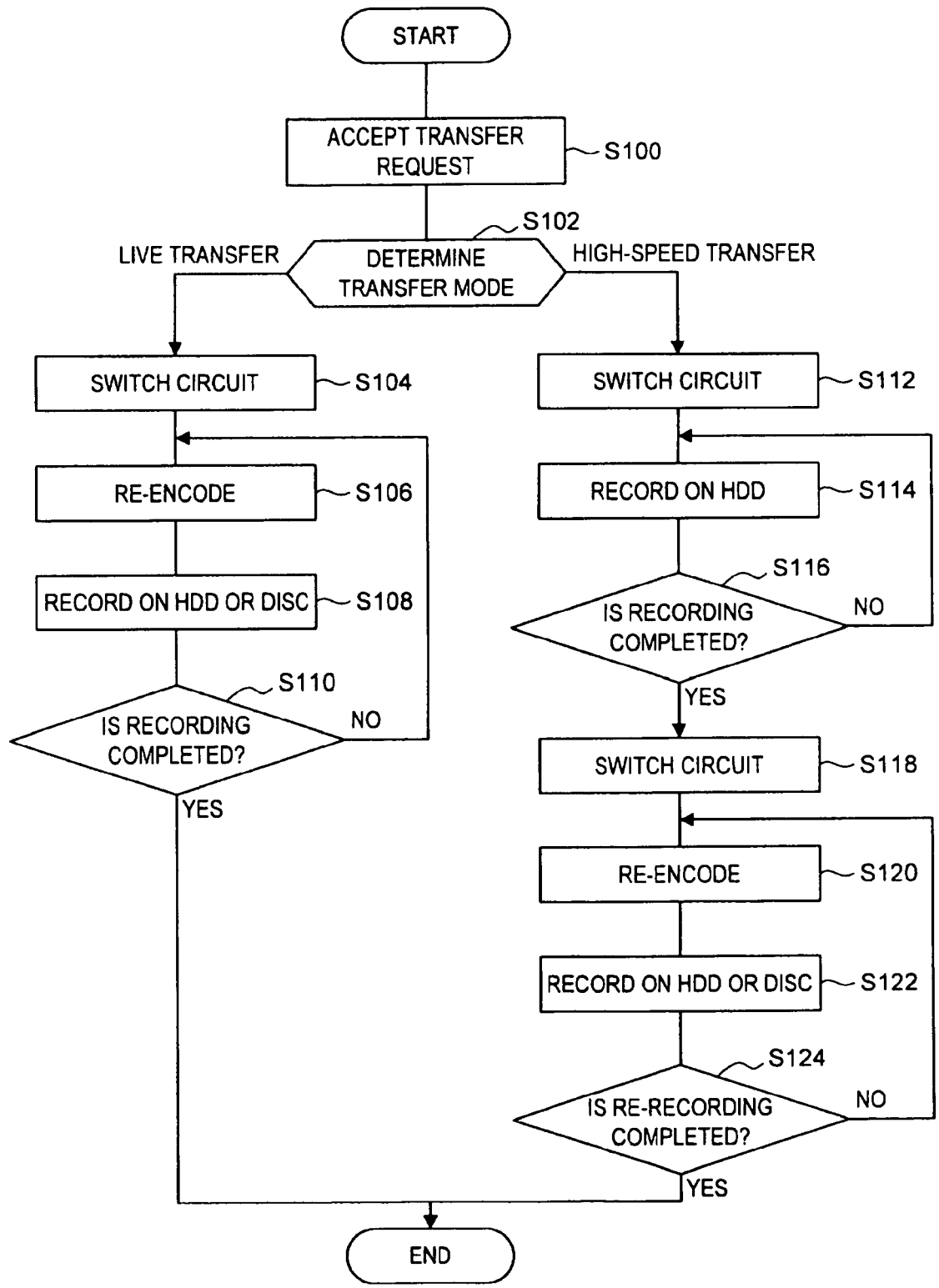
FIG. 9 is a flowchart showing a recording method in the digital recorder according to the embodiment.
Figure 10:
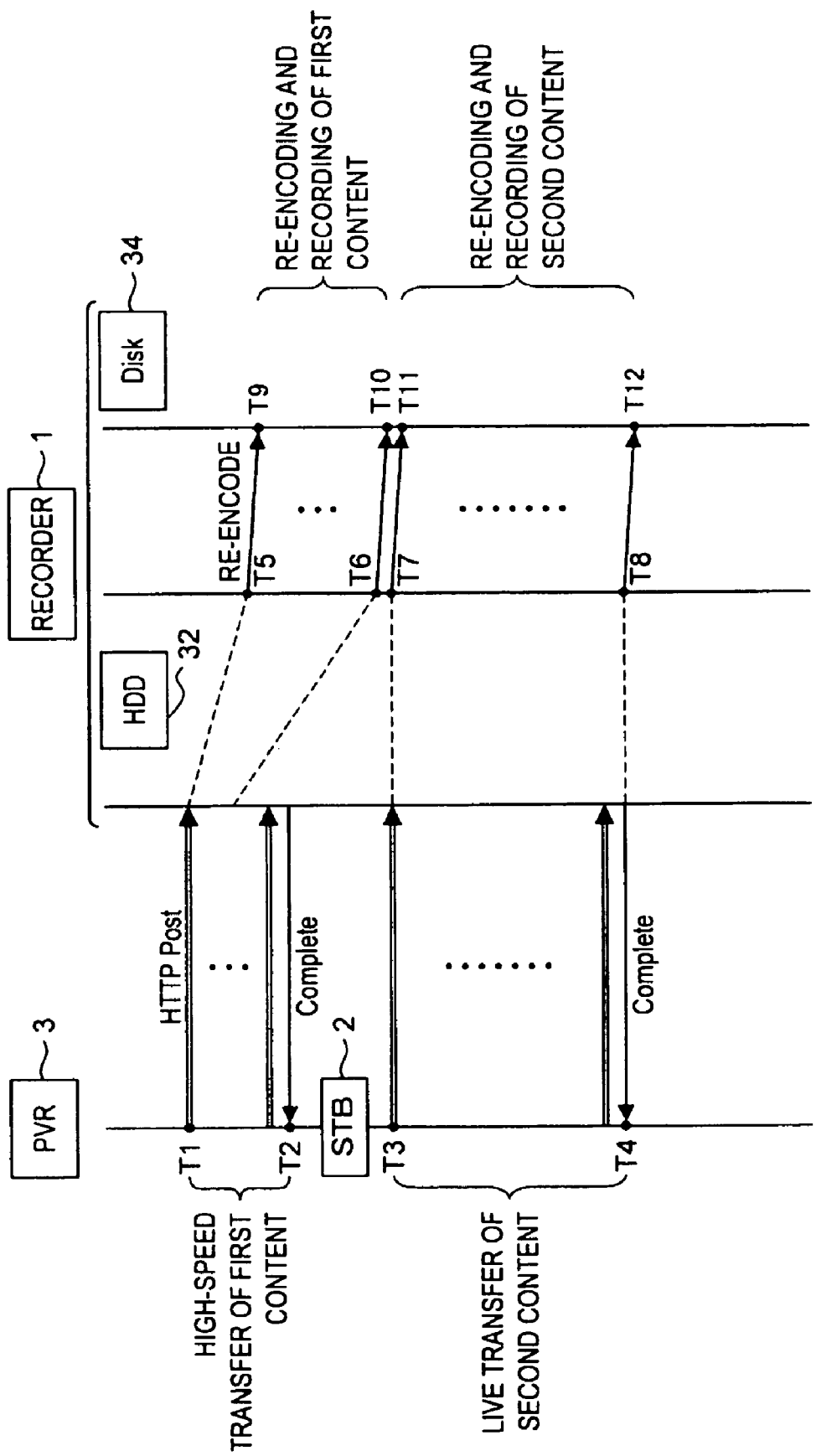
FIG. 10 is a schematic view showing a priority recording of a live transferred content when transfer of two contents according to the first embodiment compete against each other.
Figure 11:
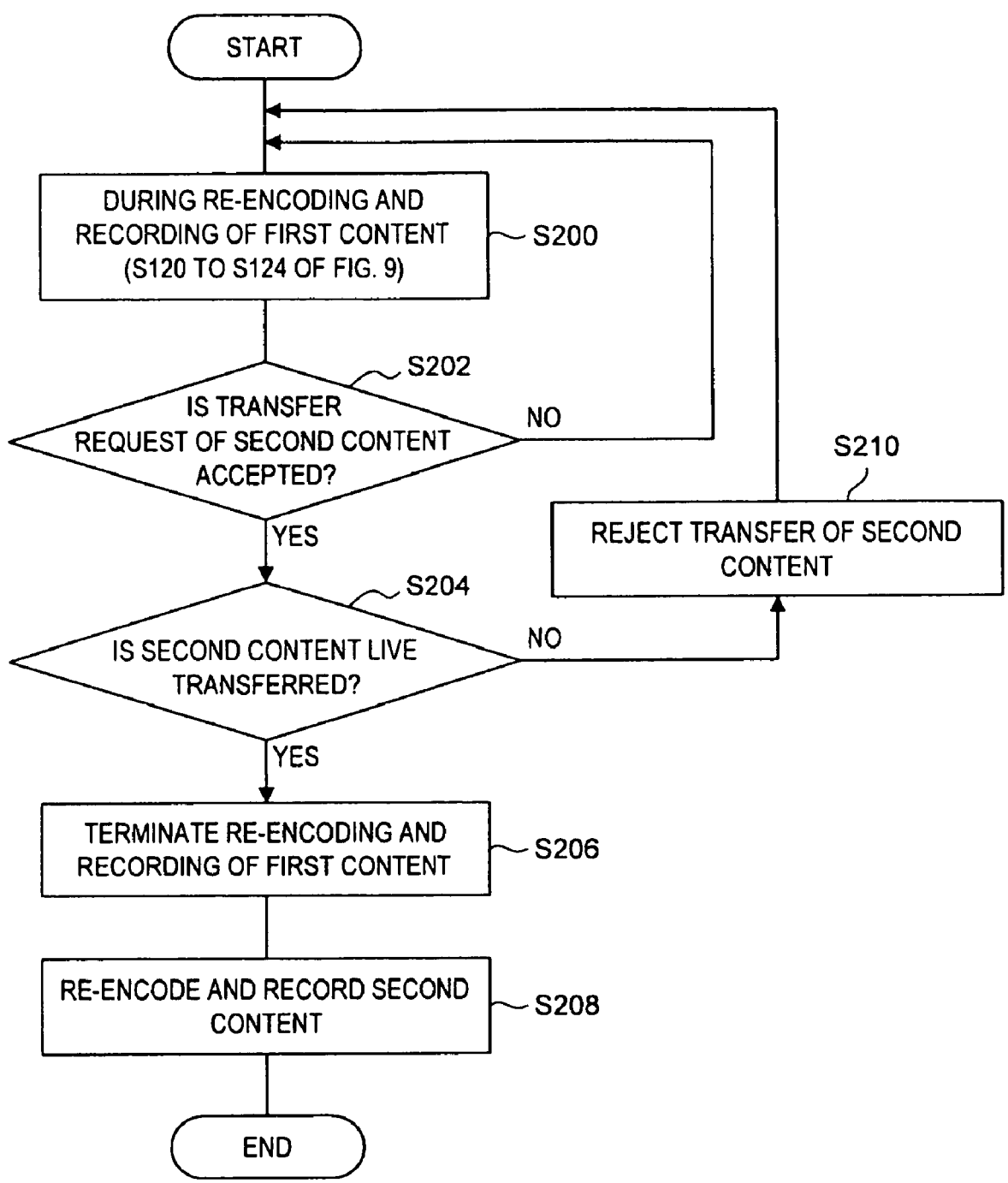
FIG. 11 is a flowchart showing the recording method in time of competition of transfer at the digital recorder according to the embodiment.

<1. Outline of recording system>
<2. Technical background of recording apparatus>: FIGS. 1 to 4
<3. Configuration of recording apparatus>: FIGS. 5 and 6
<4. Determination method of transfer mode>: FIGS. 7 and 8
<5. Recording method>: FIG. 9
<6. Priority recording of live transfer>: FIGS. 10 and 11
<7. Effects>
<1. Outline of Recording System>

First, the outline of a recording system according to a first embodiment of the present invention, and a recording apparatus of the recording system will be described.

A recording apparatus according to the present embodiment is configured as a recording and reproducing device capable of recording/reproducing externally input image or audio digital data (content data) of the broadcast program and the like to a recording medium. That is, the recording apparatus has a recording function of recording the externally input image/audio digital data on a recording medium such as optical disc or hard disc, and a reproducing function of reproducing the image/audio data recorded on the recording medium. The recording apparatus can be configured as a complex device of an optical disc recorder (correspond to second recording unit) having an optical disc as a recording medium and an HDD recorder (correspond to first recording unit) having a hard disc as a recording-medium. However, the recording apparatus according to the present invention may be configured as a recording device without the reproducing function and with only the recording function.

The recording apparatus according to the present embodiment converts a stream (content data) of image/audio signal of various formats input from an external device to a predetermined recording format and records the same on the recording medium. Since the recording medium is defined with a recording format that can be responded, the recording apparatus re-encodes and records the input content data so as to comply with the corresponding recording format of the recording medium. Here, "re-encoding" means decoding the data encoded through a predetermined compression coding method, and further encoding with another compression coding method. A device for coding/decoding the data through a predetermined method called codec is used for such re-encoding process.

The recording apparatus according to the present embodiment switches the recording method according to the transfer mode of the content data by the external device when performing re-encoding and recording to thereby realize an optimum recording method corresponding to the transfer purpose of the data.

In other words, the recording system according to the present embodiment includes a recording apparatus (device of transfer destination) and the external device (device of transfer source) that transfers the content data to the recording apparatus. The recording apparatus receives the data stream of the AV content transferred from the external device, and records the data stream on the recording medium. The external device of the transfer source is a device with a tuner for receiving the broadcast program of a television broadcast (e.g., digital TV broadcast, analog terrestrial broadcast, cable TV broadcast etc.) and the like.

Under such environment, the optimum recording method of the content data in the recording apparatus differs for when the external device is device of (1) and is device of (2) described below.

(1) Device equipped with a recording device (e.g., HDD) capable of holding the content data. For example, PVR (Personal Video Recorder).

(2) Device not equipped with the recording-device (e.g., HDD) capable of holding the content data. For example, STB (Set Top Box).

For example, in the case of (1), it is important to high-speed record (e.g., 3× recording) the content data high-speed transferred from the PVR in the recording apparatus. In the case of (2), on the other hand, it is important that the content data constant-speed transferred from the STB receiving the program currently being broadcasted is constant-speed recorded in real time but to accept the recording in the recording apparatus. However, in the recording apparatus of the related art, both (1) and (2) may not be met due to restrictions of the specification of the codec and the recording device, and such issue is desirably solved by some means.

The recording apparatus according to the present embodiment is thus configured to determine the transfer mode (e.g., high speed transfer or live transfer) of the content data transferred from the external device, and appropriately change the recording method according to the determined transfer mode. The method of determining the transfer mode includes, for example, (A) determination by copy control information (CCI) attached to the content data, (B) determination by communication result of the external device and the recording apparatus, (C) determination by set information by the user, and the like, the details of which will be described later.

The transfer mode from the external device to the recording apparatus depends on the type (e.g., STB or PVR) of the external device of the transfer source, transfer purpose, copy control method of the content, and the like. For instance, if the external device of the transfer source is an STB equipped with a tuner but not equipped with an HDD, the transfer mode is "live transfer". If the external device of the transfer source is a PVR equipped with the tuner and the HDD, the transfer mode is "high speed transfer" or "live transfer".

The "live transfer" is a transfer mode in which the external device receiving the program currently being broadcasted constant-speed transfers the content data of the relevant program in real time. The transfer rate in time of the live transfer is the normal transfer rate (constant-speed transfer rate) that can be responded with the processing ability of a re-encoding unit of the recording apparatus. The "high speed transfer" is a transfer mode of high-speed transferring the content data saved in the recording unit (e.g., HDD) of the external device. The transfer rate in time of high-speed transfer is the high-speed transfer rate that is not responded with the processing ability of the re-encoding unit of the recording apparatus. The re-encoding unit (CODEC) mounted in the recording apparatus has the processing ability limited to lower than or equal to a predetermined specification due to economical reasons. Thus, the re-encoding unit can respond (i.e., decode and encode process is possible) to the constant-speed transferred content data, but may not respond (i.e., decode and encode process is not possible) to the high-speed transferred content data.

The recording apparatus according to the present embodiment has a feature of switching the recording method depending on whether the transfer mode from the external device is live transfer or high-speed transfer. For instance, in the case of live transfer, the recording apparatus re-encodes the content data received from the external device as is, and records the same on the HDD, the optical disc, or the like (constant-speed recording). In the case of high-speed transfer, the recording apparatus first high-speed records the content data received from the external device on the HDD without re-encoding, and thereafter, reads out the content data from the HDD, re-encodes the content data at the normal transfer rate by means of the re-encoding unit, and re-records the re-encoded data on the HDD, the optical disc, or the like. Both transfer purposes of when the external device is (1) and (2) can be satisfied by switching the recording method in the above manner. The configuration of the recording apparatus according to the present embodiment for realizing the relevant feature will be specifically described below.

<2. Technical Background of Recording Apparatus: FIGS. 1 to 4>

First, prior to describing the recording apparatus according to the present embodiment, the issues of the recording apparatus (digital recorder) of the related art will be specifically described as the technical background of the present invention.

FIG. 1 is a block diagram showing a configuration of a digital recorder 100 (hereinafter referred to as "recorder 100") of the related art. As shown in FIG. 1, the recorder 100 is configured to include a digital tuner 110, a re-encoding unit 120, a recording unit 130, a trick play information generating unit 140, and switching circuits 150, 152. The re-encoding unit 120 includes a decoder 122 and an encoder 124. The recording unit 130 includes an HDD 132 and an optical disc drive 134.

In the digital TV broadcast, the broadcast wave emitted from the broadcast station is received by an antenna (not shown) and input to the recorder 100. The digital tuner 110 selects the target channel from the received broadcast wave, and extracts the MPEG-2 stream as the content data of the selected broadcast program.

When recording the relevant stream as is without re-encoding, the circuit is switched by the switching circuits 150, 152 to connect the digital tuner 110 and the recording unit 130 by way of a line 156. The stream of content is recorded on the HDD 132 or the optical disc drive 134. At the same time, the trick play information generating unit 140 analyzes the stream, and generates trick play information. The trick play information is data for trick play (special reproduction), and is recorded by being added to the content data.

In order to save the capacity and the like of the storage unit 130, the content data may be recorded after being re-encoded. For instance, consider a case of re-encoding the MPEG-2 stream of the digital TV broadcast to the stream of "H.264/MPEG-4 AVC" (hereinafter referred to as "AVC"), and then recording the same. In this case, the circuit is switched by the switching circuits 150, 152 to connect the digital tuner 110 and the recording unit 130 by way of the re-encoding unit 120 arranged on the line 154. The re-encoding unit 120 includes the decoder 122 of MPEG-2 and the encoder 124 of AVC. The content data (MPEG-2 data) of the broadcast program output from the digital tuner 110 is decoded by the decoder 122, and then re-encoded to the AVC data by the encoder 124 and recorded in the storage unit 130.

When recording the analog terrestrial TV broadcast, the output signal from an analog tuner (not shown) is directly input to the encoder 124 to be encoded to the AVC data, and then recorded on the recording unit 130. When recording the externally input data from the external device connected to the recorder 100 as well, the relevant externally input data is re-encoded by the re-encoding unit 120, as needed, and then recorded.

In the recorder 110 having such configuration, the decoder 122 and the encoder 124 only have the processing ability corresponding to the transfer rate of when the stream of the broadcast program is transmitted, and are premised on the processing speed in real time. This is because the recorder 100 is not formed inexpensively if the decoder 122 and the encoder 124 of high specification are mounted.

Therefore, the recorder 100 of the related art is premised on the signal input at the transfer rate in real time from all of the digital tuner 110, the analog tuner, and the external device. However, with widespread use of the network environment, the environment of receiving the transfer of content data from other external devices and recording the content data is diversifying in CE devices such as the recorder 100 and not only in general-purpose devices such as the PC.

Figure 2:
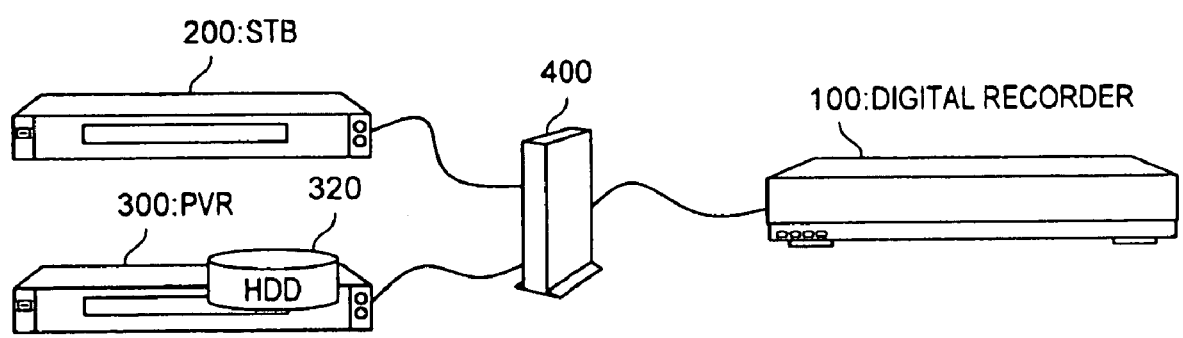
FIG. 2 is a conceptual view showing a configuration of a recording system of the related art.

For instance, as shown in FIG. 2, in a home network, a use case of connecting the STB 200 and the PVR 300 to the recorder 100 by way of a relay device 400 such as hub and router, and transferring the content data from the STB 200 and the PVR 300 to the recorder 100 is increasing.

In the example of FIG. 2, the STB 200 transfers the stream (content data) of program currently being broadcasted to the recorder 100 in real time (live transfer). The STB 200 does not have a large-capacity recording device such as HDD, and thus is not able to store content data. The PVR 300, on the other hand, includes the HDD 320, and thus can receive the stream of program currently being broadcasted and save it in the HDD 320. Thus, the PVR 300 reads out the content data saved in the HDD 320 at an arbitrary timing and high-speed transfers the content data to the recorder 100 (high-speed transfer). The PVR 300 is equipped with a tuner (not shown), and thus can also live transfer the content data of the program being broadcasted to the recorder 100 similar to the STB 200.

In the case of "live transfer", there is no issue with the recorder 100 having the configuration shown in FIG. 1. However, in the case of "high-speed transfer", the processing in the re-encoding unit 120 fails if the content data is high-speed transferred (e.g., 3× transfer) at the transfer rate of greater than or equal to the processing ability of the re-encoding unit 120 of the recorder 100. This is because the re-encoding unit 120 only has the processing ability that can respond to the transfer rate (1× transfer rate) of the live transfer. The high-speed transfer of the content from the PVR 300 to the recorder 100 can be realized with the recorder 100 having the configuration of including two HDDs 132, 136, as shown in FIG. 3.

Figure 3:
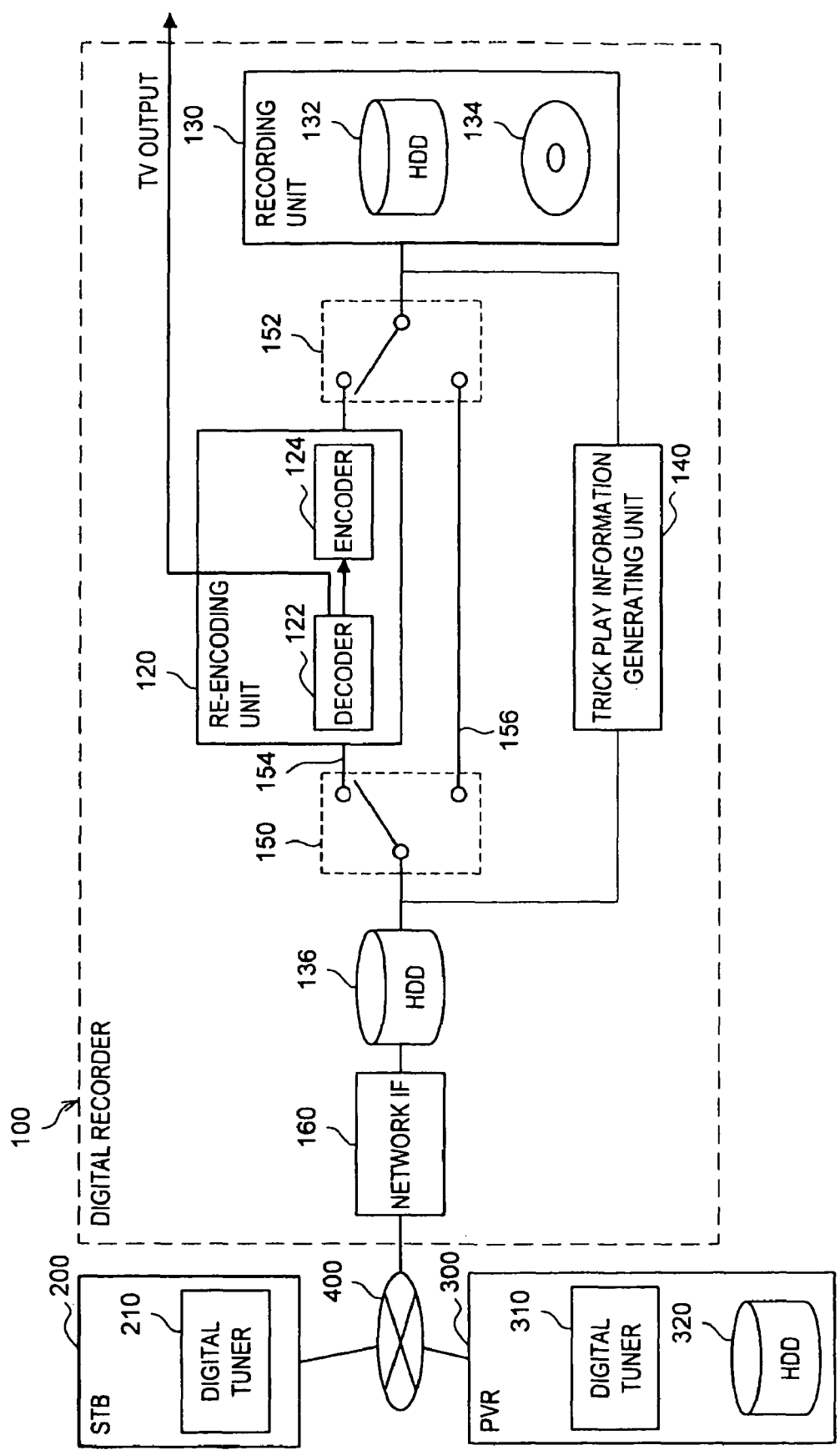
FIG. 3 is a block diagram showing another configuration of a digital recorder of the related art.

As shown in FIG. 3, the STB 200 is equipped with a digital tuner 210 for receiving the digital TV broadcast, but is not equipped with a large-capacity recording device such as HDD. Thus, the STB 200 can live transfer the stream of the received broadcast program to the recorder 100 in real time. The PVR 300 is equipped with the digital tuner 310 and the HDD 320, and high-speed transfers the stream of the received broadcast program to the recorder 100 after storing in the HDD 320.

The recorder 100 includes a network interface 160 for data communicating with the external device such as the STB 200 and the PVR 300 through a network 400, and receives the content data transferred from the STB 200 and the PVR 300 through a network IF 160. The recorder 100 includes another HDD 136 in addition to the HDD 132 between the network IF 160 and the re-encoding unit 120. The HDD 136 functions as a cache for temporarily storing the content data received at the network IF 160. The function configuration of other portions of the recorder 100 is the same as the recorder 100 of FIG. 1.

According to such configuration, high-speed transfer can be realized by first recording the content data high-speed transferred from the PVR 300 to the recorder 100 on the HDD 136. At the same time, the content data read out from the HDD 136 is re-encoded by the re-encoding unit 120 and recorded on another HDD 132 to hold the content data converted to the desired recording format.

Thus, the content data high-speed transferred from the PVR 300 is accepted by the HDD 136, and at the same time, the re-encoding is started and the content data is ultimately recorded on the HDD 132 by mounting two HDDs 132, 136 in the recorder 100.

However, the cost of the recorder 100 actually rises when two HDDs 132, 136 are mounted on the recorder. Thus, only one HDD 132 is preferably mounted on the recorder 100 to realize the high-speed transfer. The method therefor includes a method of first cashing the high-speed transferred content data in the only HDD 132 mounted on the recorder 100 in time of transfer, and thereafter, reading out the content data from the HDD 132, re-encoding the content data and recording it in the HDD 132.

However, the re-encoding may not be started in most cases unless the transfer of all contents is completed if only one HDD 132 is mounted and recording is ultimately made to the HDD 132. Thus, when transferring two content data, the re-encoding of the first and the second content data may not be started unless the transmission of the second content is completed. This will be described with reference to FIG. 4.

FIG. 4 is a schematic view showing an ideal implementation timing of re-encoding of when transferring two content data. As shown in FIG. 4, the first content data is high-speed transferred (t1 to t2) from the PVR 300 to the recorder 100, and thereafter, the second content data is high-speed transferred (t3 to t4). In response thereto, in the recorder 100, the transferred first and second content data are sequentially recorded in the HDD 132, and then re-encoded at a processing speed slower than the transfer rate (t5 to t6, t7 to t8). The re-encoded first and second content data are then sequentially recorded on the optical disc drive 134 (t9 to t10, t11 to t12).

The transfer of two content data, the recording to the HDD 132, the re-encoding, and the recording to the optical disc drive 134 are ideally simultaneously executed in parallel as in FIG. 4. However, a case where the re-encode start timing (t5) of the first content data is to be after the transfer complete timing (t4) of the second content data may exist in the actual recorder 100. The reason therefor is because the there is generally number of restricting condition of simultaneous processing due to the issue of cost in the CE device. Thus, there is great number of devices where in the high-speed transfer, the transfer of the second content data is rejected if re-encoding is started after the first content data is recorded.

In a case where the recorder 100 knows in advance that the transfer of the second content data immediately starts, re-encoding is not started at the time point the transfer of the first content data is completed and is waited until the transfer of the second content is completed so that the transfer of the second content is not rejected. However, if the start of transfer of the second content data is not known in advance, re-encoding is started immediately after the transfer of the first content data is completed. In this case, the transfer of the second content data from the PVR 300 is rejected as described above.

In view of the difference in the mode (transfer mode, transfer purpose) of the STB 200 and the PVR 300, which are transfer source, the right and wrong in rejecting the transfer of the content data will be reviewed.

If the transfer source is the PVR 300, the holding of the content data in the HDD 320 of the PVR 300 is set as a premise. Thus, even if the transfer from the PVR 300 to the recorder 100 is rejected, the content data remains in the HDD 320 of the PVR 300, and thus it does not become an issue to the user.

If the transfer source is the STB 200, the content data is not saved in the STB 200. Thus, if the transfer of the content data output from the STB 200 is rejected by the recorder 100, the relevant content data may not be saved in either the STB 200 or the recorder 100. Therefore, if reject occurs when the user intends to receive the stream of the TV program currently being broadcasted at the STB 200, and live transfers and records (i.e., live recording) the same in the recorder 100, the relevant program may be missed.

Therefore, when the recorder 100 accepts a transfer request of the content from the STB 200, the relevant transfer request is basically not rejected since the transfer mode is live transfer.

According to the technical background described above, the recorder 100 of the related art has an issue in that there is no guarantee that the content data of live transfer is reliably recorded if connected to the STB 200 and the like with the architecture (only one HDD 132 is mounted) that can respond to the high-speed transfer from the PVR 300.

Thus, a recording apparatus capable of recording with the recording method that can respond to the high-speed transfer when the transfer request of the live transfer from the STB 200 is reliably recorded without rejecting and the transfer request of the high-speed transfer from the PVR 300 is received, and capable of reliably recording without rejecting when the transfer request of the live transfer is received from the PVR 300 is desired. The present embodiment described below provides such recording apparatus.

<3. Configuration of Recording Apparatus: FIGS. 5 and 6>

A digital recorder 1 according to the present embodiment will be specifically described with reference to FIG. 5. FIG. 5 is a block diagram showing a configuration of the digital recorder 1 according to the present embodiment. The digital recorder 1 according to the present embodiment serves as a recording apparatus according to an embodiment of the present invention.

As shown in FIG. 5, the digital recorder 1 (hereinafter referred to as "recorder 1") according to the present embodiment is a digital recording and reproducing device capable of recording and reproducing image/audio digital data, and is, for example, configured as a complex device of an HDD recorder and an optical disc recorder (e.g., BD recorder).

Such recorder 1 is connected to a plurality of external devices 2, 3, and 4 by way of network 6 or cable. The network 6 is a LAN (Local Area Network) such as home network, and may be wired or wireless. In addition, the network 6 may be a public line network such as Internet, telephone line network, satellite communication network, cable television line network and the like. The recorder 1 may also be wire connected with the external devices 2, 3, and 4 by USB (Universal Serial Bus) cable and the like.

As shown in FIG. 5, the external device may be the STB 2, the PVR 3, and another digital recorder 4. However, the external device may be an arbitrary electronic-device including a general-purpose device such as a personal computer, information household electronics such as television receiver and household game machine, digital video camera, digital still camera, storage device, and portable terminal.

The STB 2 (first external device) is a device equipped with a digital tuner 21 for receiving digital TV broadcast but not equipped with a large-capacity recording device such as HDD. The STB 2 receives a stream (content data) of the program currently being broadcasted, and transfers the relevant stream to the recorder 1 in real time (live transfer). Since the STB 2 itself does not have a recording function, issues arise if the program content currently being broadcasted that is received at the STB 2 may not be live recorded in the recorder 1 which is the transfer destination.

The PVR 3 (second external device) is equipped with a digital tuner 31 and a HDD 33, and thus can receive a stream of program currently being broadcasted and save the stream in the HDD 33. Thus, the PVR 31 can read out the content data saved in the HDD 33 at an arbitrary timing, and high-speed transfer the content data to the recorder (high-speed transfer). Similar to the STB 200, the PVR 3 can also receive the content data of the program being broadcasted at the digital tuner 31, and live transfer the same to the recorder 1. The digital recorder 4 (third external device) is also equipped with the digital tuner and the HDD (not shown), similar to the PVR 3, and thus can live transfer or high-speed transfer the content data to the recorder 1.

As described above, the PVR 3 (hereinafter also referred to as "DVR") can be assumed as a device in which the recording device such as the HDD 33 is mounted on the STB 2. However, although the PVR 3 has the function of recording the content data of the broadcast program encoded with MPEG-2 and the like in the HDD 33, it does not have the function of recording the content data in the disc. The recorder 1, on the other hand, is a recording device capable of recording not only to the HDD 33 but also the optical disc drive 34 such as BD and DVD, and various recording media such as memory card (not shown). Therefore, the recorder 1 has a function of re-encoding the content data to record to various recording media corresponding to distinct recording formats. The configuration of the recorder 1 will be described in detail below.

The recorder 1 mainly includes an external interface 10, a re-encoding unit 20, a recording unit 30, switching circuits 40, 42, a CPU (Central Processing Unit) 50, a ROM (Read Only Memory) 52, a RAM (Random Access Memory) 54, a digital tuner 15, and a user interface 60. The recorder 1 may also additionally include an analog tuner for receiving analog broadcast, an A/D converter for converting the analog signal to the digital signal, a stream processor for processing the stream of content, an image processing unit for processing the reproduced content data, and the like (all of which are not shown). Each unit of the recorder 1 will be described below.

The external interface 10 is an interface for data communicating with the external devices 2, 3, and 4 connected to the recorder 1. The external interface 10 is input with AV stream (content data) of a TV broadcast program and the like transferred from the external devices 2, 3, and 4. Such AV stream may be an HD (High Definition) image stream or an SD (Standard Definition) image stream, and may have an arbitrary image quality. The external interface 10 includes a network interface 11 and an external input terminal 12.

The network IF 11 is an interface for communicating with the external devices 2, 3, and 4 by way of the network 6. A standard enabling high-speed transfer such as HDRL or windows media DRM may be used for the communication standard of the recorder 1 and the external devices 2, 3, and 4. In such standards, high-speed transfer at a transfer rate of few times the normal transfer rate is achieved if the network environment is satisfactory. The network IF 11 can receive the AV stream of the program of the IPTV (Internet Protocol Television) distributed through the network 6.

The external input terminal 12 includes input terminals of various standards such as USB terminal, DV input terminal, i.LINK terminal and the like. The external input terminal 12 is connected with a cable corresponding to such standards, so that the recorder 1 can communicate with the external devices 2, 3, and 4 through such cable.

The digital tuner 15 selects the target channel from the electric wave received at the antenna 5 for satellite digital broadcast or terrestrial digital broadcast, and outputs the image and audio digital data (bit stream) of the relevant channel. The digital stream (content data) output from the external interface 10 or the digital tuner 20 is input to the re-encoding unit 20 or the recording unit 30.

The re-encoding unit 20 has a function of re-encoding the input content data. The re-encoding unit 20 includes a decoder 22 and an encoder 24. The decoder 22 performs a decoding process of decoding and decompressing the image and audio digital stream compression coded through a predetermined compression coding method. The encoder 24 performs an encode process of compression coding the image and audio digital stream decoded by the decoder 22 through a different compression coding method. The process of the encoder 24 to again encode the digital stream decoded by the decoder 22 through a different compression coding method corresponding to the recording format of the recording unit 30 is the re-encoding process.

Regarding the compression coding method (codec type) used in the encoder 24 and the decoder 22, MPEG-2, AVC, VC1, and the like can be used for image, and Dolby AC3, MPEG-2 AAC (Advanced Audio Coding), LPCM (Linear Pulse Code Modulation), and the like can be used for audio.

The digital stream of the content data re-encoded by the re-encoder is multiplexed and encrypted by a stream processor (not shown), and recorded on the recording medium of the recording unit 30. In time of data reproduction, the data read out from the recording medium of the recording unit 30 is decrypted and demultiplexed by the stream processor, and then output to the decoder 22 for decoding.

The recording unit 30 has a function of recording the content data output from the external interface 10 or the content data re-encoded by the re-encoding unit 20. The recording unit 30 includes the HDD 32 and the optical disc drive 34. The HDD 32 is a recording device (correspond to first storage unit) having the hard disc as the recording medium. The optical disc drive 34 is a recording device (correspond to second storage unit) having an optical disc such as BD, DVD, HD-DVD, CD, and MD as the recording medium.

The HDD 32 writes/reads various information to and from the hard disc, which is the recording medium. The HDD 32 records the stream of image/audio data input from the stream processor on the hard disc. The HDD 32 also reads out data recorded on the hard disc and outputs to the stream processor. Similarly, the optical disc drive 34 also writes/reads out various information to and from the optical disc serving, which is the recording medium.

The recording unit 30 is not limited to the example of the HDD 32 or the optical disc drive 34, and an arbitrary recording device having various types of semiconductor memory such as flash memory and the like as the recording medium can be used as long as it is a recording device having the capacity capable of recording the content data. The recording medium may be a recording medium built in the recorder 1 or may be a recording medium removable with respect to the recorder 1.

The switching circuits 40, 42 have a function of changing the connection relationship of the circuits in the recorder 1 based on the instruction from the CPU 50. For example, the switching circuits 40, 42 may input the output data of the external interface 10 to the recording unit 30 through the re-encoding unit 20 using a line 44, or may input the output data of the external interface 10 to the recording unit 30 without passing through the re-encoding unit 20 using a line 46.

The CPU 50 is an arithmetic processing device that operates according to a predetermined program, and has a function serving as a control unit for controlling each device in the recorder 1. The CPU 50 executes various processes while using the RAM 54 according to the program stored in the ROM 52, or the program loaded to the RAM 54 from the recording apparatus such as the HDD 32 or the optical disc drive 34. The ROM 52 stores programs used by the CPU 50, parameters that appropriately change in execution of the program, and the like.

The user interface 60 has a function serving as an input unit for the user to input various instructions to the recorder 1. The user interface 60 is configured to include an operation means such as keys including button, switch, and lever, touch panel, remote controller, and the like, an input control circuit for generating an input signal according to the input operation on the operation means and outputting the same to the CPU 50, and the like. The user of the recorder 1 operates the user interface 60 to input various data to the recorder 1 or instruct the processing operation.

The configuration of the recorder 1 according to the present embodiment has been described with reference to FIG. 5. The operation of recording the bit stream of the content data transferred from the external devices 2, 3, and 4 in the recording unit 30 in the recorder 1 will now be described with reference to FIGS. 5 and 6. FIG. 6 is a block diagram showing a recording operation of the recorder 1 according to the present embodiment, where FIG. 6A shows a re-encoding and recording operation of the live transferred content data, and FIG. 6B shows a direct recording and a re-encoding and recording operation of the high-speed transferred content data.

As described above, if the external device of the transfer source is the STB 2, the recorder 1 is desired to reliably record the content data live transferred from the STB 2 without rejecting the transfer request from the STB 2 so as not to lose the content data. If the external device of the transfer source is the PVR 3 or another recorder 4, and the content data is high-speed transferred, the recorder 1 may reject the transfer request but desirably able to perform high-speed recording in correspondence to the high-speed transfer.

The CPU 50 of the recorder 1 determines whether the transfer mode of the content data transferred from the external devices 2, 3, 4 is high-speed transfer or live transfer, and switches the hardware configuration of the recorder 1 according to the determined transfer mode to change the recording method. Specifically, if the determined transfer mode is the live transfer, the CPU 50 controls the switching circuits 40, 42 to connect each device to perform re-encoding and recording as shown in FIG. 6A. If the determined transfer mode is the high-speed transfer, on the other hand, the CPU 50 controls the switching circuits 40, 42 to connect each device to perform re-encoding and recording after direct recording, as shown in FIG. 6B. Both cases will be specifically described below.

As shown in FIG. 6A, if the content data currently being broadcasted is live-transferred from the STB 2, the CPU 50 controls the connection of each device such that the live transferred content data is input in the order of the external IF 10, the decoder 22, the encoder 24, and the HDD 32 or the optical disc drive 34. The content data live transferred from the STB 2 to the recorder 1 at a normal transfer rate to which the re-encoding unit 20 can respond is thereby re-encoded and recorded in real time in the recorder 1.

In other words, the live transferred content data is first received by the external IF 10, decoded by the decoder 22, and then encoded by the encoder 24 to comply with the recording format of the recording unit 30, and ultimately recorded in the HDD 32 or the optical disc drive 34 of the recording unit 30. The live transfer is a constant-speed transfer at the transfer rate to which the re-encoding unit 20 can respond, and thus the processing of the recorder 1 will not fail even if the re-encoding and recording are performed. A case where the content data is live transferred from the STB 2 has been described above, but cases where the content data is live transferred from the PVR 3 or another recorder 4 are also the same.

As shown in FIG. 6B, if the content data saved in the PVR 3 is high-speed transferred from the PVR 3, the CPU 50 controls the circuit configuration such that the high-speed transferred content data is input in the order of the external IF 10, the HDD 32, the decoder 22, the encoder 24, and the HDD 32 or the optical disc drive 34. The content data high-speed transferred from the PVR 3 to the recorder 1 at high transfer rate to which the re-encoding unit 20 does not respond is then first directly recorded in real time and then re-encoded and recorded in the recorder 1.

In other words, the high-speed transferred content data is first received by the external IF 10, and then directly recorded in the HDD 32 without being re-encoded. In direct recording, the HDD 32 having fast processing speed records the content data input at high transfer rate at high speed, and the re-encoding unit having low processing speed does not perform the process. Thus, the high-speed transferred content data can be reliably recorded without failing the recording process.

After all the content data are directly recorded in the HDD 32, re-encoding and recording are started at an arbitrary timing. The content data read out from the HDD 32 is then decoded by the decoder 22, encoded by the encoder 24 so as to comply with the recording format of the recording unit 30, and then recorded in the HDD 32 or the optical disc drive 34 of the recording unit 30. A case where the content data is high-speed transferred from the PVR 3 has been described above, but a case where the content data is live transferred from another recorder 4 is also the same.

Therefore, the recorder 1 according to the present embodiment can determine whether the transfer mode from the external device of the transfer source is live transfer or high-speed transfer, change the hardware configuration (signal path) of the recorder 1 according to the determined transfer mode, and record the data with an appropriate recording method. Thus, if the content data is live transferred, re-encoding and recording can be reliably performed without rejecting the transfer request. If the content data is high-speed transferred, on the other hand, the high-speed transferred content data can be received without failing the process in the recorder 1, and ultimately re-encoded and recorded at the desired recording format.

<4. Determination Method of Transfer Mode: FIGS. 7 and 8>

Next, the method of determining the transfer mode in the recorder 1 according to the present embodiment will now be described. The determination method includes, for example, (A) determination by copy control information (CCI), (B) determination by communication result between the external device 2, 3, 4 and the recorder 1, (C) determination by set information of the user, and the like. Each determination method will be described below.

(A) Determination by Copy Control Information (CCI)

When transferring the content data between devices according to the communication standard such as HDRL, the copy control information (CCI) is added to the stream of content data for digital right management (DRM) of the digital content. A method for the CPU 50 of the recorder 1 to automatically determine the transfer mode based on the CCI will be described here.

The CCI is information for controlling the copy of the content data between devices. The code of the CCI includes, for example, (1) "Copy Once", (2) "Copy No More", (3) "Copy Free", (4) "Copy Never", and the like. Such codes of the CCI represent the level of limitation of the copy, and are correlated with the transfer mode of the content. The information in which the code of the CCI and the transfer mode are associated is held in the memory of the recorder 1, so that the CPU 50 can determine the transfer mode in the following manner by referencing the CCI contained in the stream of content and the associated information in time of content transfer.

(1) "Copy Once"

The "Copy Once" represents the content that can be copied only once, and is generally given to the content of the broadcast program. The content given "Copy Once" is the important content data that is being digitally right managed, and thus reliable recording is to be guaranteed. Therefore, the content given the "Copy Once" is the content transferred from the STB 2 and the like, and the transfer mode is determined as "live transfer".

(2) "Copy No More"

The "Copy No More" represents the content that can be moved between the devices. The content given the "Copy No More" is the content that is moved between the devices, and thus is usually saved in the device of the movement source, and issues do not arise even if the transfer is rejected. Therefore, such content is the content transferred from the device of the movement source such as the PVR 3 or another recorder 4, and the transfer mode is determined as "high-speed transfer".

(3) "Copy Free"

The "Copy Free" indicates that the content data can be freely copied. For instance, the "Copy Free" is given to the content in which the necessity of the DRM is low such as news program. Therefore, the content data given "Copy Free" is the content of low importance and in which issues do not arise even if the transfer is rejected, and thus the transfer mode is determined as "high-speed transfer".

(B) Determination by Communication Result between the External Device 2, 3, 4 and the Recorder 1

Prior to the transfer of the content data, the recorder 1 communicates with the external device 2, 3, 4 of the transfer source and checks the transfer speed or the transfer mode itself ( ) with each other to automatically determine the transfer mode. For instance, the recorder 1 communicates to the STB 2 or the PVD 3 of the transfer source by way of the network 6 before transfer, and receives information indicating whether the transfer mode is "constant-speed transfer (live transfer)" or "high-speed transfer" to determine the transfer mode. The specific example thereof will be described below.

Prior to the transfer, a transfer method representing the following two implications is specified from the external device 2, 3, 4 of the transfer source to the recorder 1. The recorder 1 receives such specification and determines the transfer mode.

(1) "High-speed transfer" in which high-speed recording is important (2) "Live transfer" in which recording may be at constant speed but in which accepting the recording is important A method of specifying the transfer mode in a communication protocol of HDRL will be described with reference to FIGS. 7 and 8. FIG. 7 is a sequence chart showing the communication in the transfer protocol defined in the HDRL. FIG. 8 is an explanatory view showing a specific example of a command used in the communication protocol.

As shown in FIG. 7, in the HDRL, when transferring the content data from the PVR 3 of the transfer source to the recorder 1 of the transfer destination, predetermined commands and data are exchanged between the PVR 3 and the recorder 1. Among them, some parameters are set for "CreateObjectAction", as shown in FIG. 8. For example, as shown with a reference number 80 in FIG. 8, tags such as <TransferMode> is set at appropriate positions, and parameters such as "Live" representing "live transfer" and "Speed" representing "high-speed transfer" are specified. The transfer mode ("live transfer" or "high-speed transfer") then can be specified from the PVR 3 to the recorder 1 in advance before performing the subsequent stream transfer of "HTTP Post". The recorder 1 then determines the transfer mode based on the specification of the transfer mode from the PVR 3 and accordingly switches the recording method before receiving the stream transfer of "HTTP Post".

(C) Determination by Set Information of the User

The user initially sets the transfer mode from the external device to the recorder 1 to "live transfer" or "high-speed transfer" in a setup menu of the recorder 1. The use can appropriately set the transfer mode as the user knows the device the user owns and also its connection status. For instance, if the user connects only the PVR 3 to the recorder 1, the user may set "high-speed transfer". If the external device is in plurals, the user may set the transfer mode for each external device. The recorder 1 thus can determine the transfer mode from the external device 2, 3, 4 by referencing the set information of the user.

<5. Recording Method: FIG. 9>

The recording method in the recorder 1 according to the present embodiment will now be described with reference to FIG. 9. FIG. 9 is a flowchart showing the recording method in the recorder 1 according to the present embodiment.

As shown in FIG. 9, the recorder 1 first receives the transfer request from the external device (STB 2, PVR 3, another recorder 4, etc.) (S100). The recorder 1 then determines whether the transfer mode of the content data by the external device is live transfer or high-speed transfer (S102). The determination of the transfer mode is made through one of the determination methods (A) to (C) described above.

If determined that the transfer mode is the live transfer from the STB 2 in the determination of S102, the recorder 1 switches the switching circuits 40, 42 to execute the recording method (i.e., re-encoding and recording in real time: see FIG. 6A) adapted to the live transfer (S104).

The recorder then re-encodes and records in real time while receiving the content data live transferred from the external device (S106, S108). That is, the recorder 1 re-encodes the stream of content data transferred from the external device by means of the re-encoding unit 20 (S106), and records the re-encoded content data to the HDD 32 or the optical disc drive 34 (S108). After re-encoding and recording of the transferred content data is completed (S110), all processing is terminated.

If determined that the transfer mode is high-speed transfer from the PVR 3 or another recorder 4 in the determination of S102, the recorder 1 switches the switching circuits 40, 42 to execute the recording method (i.e., direct recording in real time: see FIG. 6B) adapted to the high-speed transfer (S112).

The recorder 1 then directly records the content data in the HDD 32 in real time while receiving the content data high-speed transferred from the external device (S114). That is, the recorder 1 high-speed records the stream of content data transferred from the external device to the HDD 32 at the processing speed corresponding to the transfer rate of high speed without re-encoding by means of the re-encoding unit 20 (S114). After the direct recording of transferred content data is completed (S116), the process proceeds to S118.

Thereafter, the recorder 1 switches the switching circuits 40, 42 to execute the recording method (i.e., re-encoding and recording of content data saved in the HDD 32; see FIG. 6B) after completion of transfer (S118).

The recorder 1 re-encodes and records the content data while reading out the content data from the HDD 32 (S120, S122). That is, the recorder 1 re-encodes the stream obtained by reading out the content data saved in the HDD 32 by means of the re-encoding unit 20 (S120), and records the re-encoded content data in the HDD 32 or the optical disc drive 34 (S122). After re-encoding and recording of all the content data saved in the HDD 32 is completed (S124), all processing is terminated.

According to the recording method described above, the content data transferred from the external device can be re-encoded and recorded at the predetermined recording format with the recording method corresponding to live transfer or high-speed transfer.

<6. Priority Recording of Live Transfer: FIGS. 10 and 11>

The priority recording of the live transferred content data in the recorder 1 according to the present embodiment will be described with reference to FIGS. 10 and 11.

As described above, the content data live transferred from the STB 2 is desirably recorded in the recorder 1. However, if live transfer request is received from the STB 2 while re-encoding and recording the content data 1 high-speed transferred from the PVR 3 and the like, the recorder 1 is not able to simultaneously execute both recordings. When the high-speed transfer and the live transfer compete against each other, the recorder 1 stops or pauses the re-encoding and recording process of the content data high-speed transferred and already saved, and preferentially re-encodes and records the live transferred content data. The live transferred content data is thus reliably recorded in the recorder 1, and loss of the relevant content data can be prevented. The priority recording of such live transfer will be specifically described below.

FIG. 10 is a schematic view showing the priority recording of the live transferred content when transfer of two content according to the present embodiment compete against each other. As shown in FIG. 10, when the first content data is high-speed transferred (T1 to T2) from the PVR 3 to the recorder 1, the recorder 100 receives the high-speed transferred first content data, directly records the same in the HDD 32, and then starts the re-encoding of the first content data read out from the HDD 32 and the recording to the optical disc drive 34 (T5 to T6, T9 to T10).

Assume the recorder 1 receives the live transfer request (T3) of the second content data from the STB 2 while re-encoding and recording the first content data. Whether the transfer request is the live transfer request is determined by the content of the specification <TransferMode> of the transfer mode shown in FIG. 8. The recorder 1 stops or pauses (T6, T10) the re-encoding and recording process of the first content data according to the live transfer request (T3), and starts the re-encoding and recording of the second content data live transferred from the STB 2 (T7, T11). Here, "premature ending" of the re-encoding and recording process refers to temporarily "interrupting" the relevant process, and "termination" of the re-encoding and recording process means completely "canceling" the relevant process.

Since the live transfer is a constant speed transfer, the time (T3 to T4) necessary for live transfer is longer than the time (T1 to t2) necessary for high-speed transfer. The re-encoding unit 20 of the recorder 1 can re-encode the content data at the processing speed of same as or higher than the transfer rate of the live transfer. Thus, the recorder 1 re-encodes the second content data live transferred from the STB 2 at substantially real time (T7 to T8), and records the same in the optical disc drive 34 (T11 to T12).

Therefore, when receiving the transfer request of the second content data from the STB 2 while re-encoding the first content data already saved in the HDD 32, the recorder 1 stops or pauses the re-encoding process of the first content data, and preferentially executes the recording of the live transferred second content data. If after the completion of the live recording of the second content data, the recorder 1 can resume the re-encoding and recording process of the first content data at an arbitrary timing.

The recording method of when two content data transfer compete against each other will be described with reference to FIG. 11. FIG. 11 is a flowchart showing the recording, method in time of competition of transfer at the recorder 1 according to the present embodiment.

As shown in FIG. 11, when re-encoding and recording the first content data high-speed transferred from a certain external device (S200), the recorder 1 monitors whether or not the transfer request of the second content data from the external device or another external device is made (S202). If the transfer request of the second content data is accepted during the re-encoding and the recording of the first content data as a result, the transfer mode is determined as live transfer (S204).

If the transfer mode of the second content data is live transfer as a result of determination, the recorder 1 stops or pauses the re-encoding and recording of the first content data (S206). The recorder 1 then re-encodes the live transferred second content data in real time while receiving, and live records the same in the HDD 32 or the optical disc drive 34 (S208).

If the transfer mode of the second content data is high-speed transfer as a result of the determination in S204, the recorder 1 rejects the transfer of the second content data (S210), and continues to re-encode and record the first content data (S212).

Therefore, when the live transfer and the high-speed transfer compete against each other, the live transferred content data is preferentially recorded even by stopping or pausing the process of the high-speed transferred content data. The live transferred content data is thus reliably recorded, and such content data can be prevented from being unsaved in the external device of transfer source and the recorder 1.

<7. Effects>

The recorder 1 which is the recording apparatus in the recording system of the present embodiment, and the recording method thereof have been described in detail. According to the present embodiment, the recorder 1 can determine the transfer mode of the content data by the external device of the transfer source, change the circuit configuration according to the determined transfer mode, and record the content data with the appropriate recording method. For example, the content data of the program being broadcasted that is live transferred from the STB 2 and the like can be reliably recorded without recording leakage. Furthermore, even if the recorder 1 is only equipped with one HDD 32 and the re-encoding unit 20 only has the processing ability responding to live transfer, the content data high-speed transferred from the PVR 3 can be suitably recorded. Therefore, an appropriate recording process can be executed while flexibly responding to the request of various transfer modes from the external device.

When the high-speed transfer and the live transfer compete against each other, the recorder 1 stops or pauses the re-encoding and recording process of the high-speed transferred content data saved in the HDD 32, and preferentially re-encodes and records the live transferred content data. Thus, the broadcasting content data live transferred form the STB 2 and the like to the recorder 1 is reliably recorded, and loss of the content data can be prevented.

The transfer mode of the content data by various types of external devices can be appropriately determined using the determination methods (A) to (C) described above.

The present application contains subject matter related to that disclosed in Japanese Priority Patent Application JP 2008-150909 filed in the Japan Patent Office on Jun. 9, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

For example, the recorder 1 according to the embodiment is configured as a recording and reproducing device having the recording function and the reproducing function, but the present invention is not limited to such example. The recording apparatus of the present invention may be configured as a recording-only device having only the recording function.

The recorder 1 for recording both image and audio has been described in the above embodiment, but the present invention is also applicable to a recording apparatus for recording only one of either image or audio.

In the recording system of the embodiment, the recorder 1 is connected to a plurality of external devices 2, 3, and 4, but is not limited to such example. The recording apparatus of the present invention is merely connectable to at least one external device, and the connection mode and the data communication method may be arbitrary.

The transfer mode of the content data from the external device to the recording apparatus is not limited to high-speed transfer and live transfer. For example, the transfer mode may include transfer modes (low-speed transfer etc.) other than the above, or may be different types of transfer mode (e.g., high image quality transfer, low image quality transfer, etc.).

What is claimed is:

1. A recording apparatus comprising:
    an interface configured to receive content data transferred from at least one external device;
    a re-encoding unit, coupled to the interface, configured to re-encode the content data;
    a recording unit, coupled to the re-encoding unit, configured to record the content data; and
    a control unit, coupled to the re-encoding unit and the recording unit, configured to:
        determine, based on a transfer speed, a transfer mode of the content data transferred from the external device,
        re-encode the content data using the re-encoding unit and record the re-encoded content data in the recording unit when the determined transfer mode is a first speed-based transfer mode with which the re-encoding unit is compatible, and
        record the content data transferred from the external device in the recording unit, and thereafter, re-encode the content data read out from the recording unit using the re-encoding unit, and re-record the re-encoded content data in the recording unit when the determined transfer mode is a second speed-based transfer mode with which the re-encoding unit is not compatible.

2. The recording apparatus according to claim 1, wherein, when accepting a transfer request of second content data transferred in the first speed-based transfer mode from the external device while re-encoding first content data transferred in the second speed-based transfer mode from the external device by the re-encoding unit and re-recording the re-encoded first content data in the recording unit, the control unit stops or pauses re-encoding and re-recording process of the first content data, and re-encodes the second content data by the re-encoding unit and records the re-encoded second content data in the recording unit.

3. The recording apparatus according to claim 1, wherein the first speed-based transfer mode is a live transfer of transferring the content data currently being received by the external device at a transfer rate with which the re-encoding unit is compatible, and
    the second speed-based transfer mode is a high-speed transfer of transferring the content data saved in the external device at a transfer rate with which the re-encoding unit is not compatible.

4. The recording apparatus according to claim 1, wherein the control unit determines the transfer mode of the content data by the external device by communicating with the external device before transfer of the content data.

5. The recording apparatus according to claim 1, wherein the control unit determines the transfer mode of the content data by the external device based on copy control information transferred with the content data.

6. The recording apparatus according to claim 1, wherein the control unit determines the transfer mode of the content data by the external device based on set information set in advance by a user.

7. The recording apparatus according to claim 1, wherein the recording unit includes:
    a first recording unit capable of recording the content data even if the content data transferred from the external device is not re-encoded; and
    a second recording unit capable of recording the content data if the content data transferred from the external device is re-encoded, and
    the control unit records the content data in the first recording unit, and thereafter, re-encodes the content data read out from the first recording unit by the re-encoding unit and records the re-encoded content data in the second recording unit when the determined transfer mode is the second speed-based transfer mode.

8. The recording apparatus according to claim 2, wherein the first speed-based transfer mode is a live transfer of transferring the content data currently being received by the external device at a transfer rate with which the re-encoding unit is compatible, and
    the second speed-based transfer mode is a high-speed transfer of transferring the content data saved in the external device at a transfer rate with which the re-encoding unit is not compatible.

9. The recording apparatus according to claim 2, wherein the control unit determines the transfer mode of the content data by the external device by communicating with the external device before transfer of the content data.

10. The recording apparatus according to claim 2, wherein the control unit determines the transfer mode of the content data by the external device based on copy control information transferred with the content data.

11. The recording apparatus according to claim 2, wherein the control unit determines the transfer mode of the content data by the external device based on set information set in advance by a user.

12. The recording apparatus according to claim 2, wherein the recording unit includes:
    a first recording unit capable of recording the content data even if the content data transferred from the external device is not re-encoded; and
    a second recording unit capable of recording the content data if the content data transferred from the external device is re-encoded, and
    the control unit records the content data in the first recording unit, and thereafter, re-encodes the content data read out from the first recording unit by the re-encoding unit and records the re-encoded content data in the second recording unit when the determined transfer mode is the second speed-based transfer mode.

13. A recording method comprising the steps of:
    determining, based on a transfer speed, a transfer mode of content data transferred from an external device;
    re-encoding the content data using a re-encoding unit and recording the re-encoded content data in the recording unit when the determined transfer mode is a first speed-based transfer mode with which the re-encoding unit is compatible; and
    recording the content data transferred from the external device in the recording unit, and thereafter, re-encoding the content data read out from the recording unit using the re-encoding unit, and re-recording the re-encoded content data in the recording unit when the determined transfer mode is a second speed-based transfer mode with which the re-encoding unit is not compatible.

14. A non-transitory computer readable recording medium recorded with a program for causing a computer to execute the steps of:
    determining, based on a transfer speed, a transfer mode of content data by an external device;

re-encoding the content data using a re-encoding unit and recording the re-encoded content data in the recording unit when the determined transfer mode is a first speed-based transfer mode with which the re-encoding unit is compatible; and recording the content data transferred from the external device in the recording unit, and thereafter, re-encoding the content data read out from the recording unit using the re-encoding unit, and re-recording the re-encoded content data in the recording unit when the determined transfer mode is a second speed-based transfer mode with which the re-encoding unit is not compatible.

15. A recording system comprising:

a recording apparatus; and at least one external device configured to transfer content data to the recording apparatus, wherein the recording apparatus includes:

an interface for receiving the content data transferred from the external device;

a re-encoding unit, coupled to the interface, configured to re-encode the content data, wherein the external device includes at least one of a first external device for transferring the content data to the recording apparatus in a first transfer mode with which the re-encoding unit is compatible, or a second external device for transferring the content data to the recording apparatus in a second transfer mode with which the re-encoding unit is not compatible;

a recording unit, coupled to the re-encoding unit, configured to record the content data; and a control unit, coupled to the re-encoding unit and the recording unit, configured to:

determine, based on a transfer speed, a transfer mode of the content data transferred from the external device, re-encode the content data using the re-encoding unit and record the re-encoded content data in the recording unit when the determined transfer mode is the first speed-based transfer mode, and record records the content data transferred from the external device in the recording unit, and thereafter, re-encode the content data read out from the recording unit using the re-encoding unit, and re-record the re-encoded content data in the recording unit when the determined transfer mode is the second speed-based transfer mode.

* * * * *